Oct. 2, 1956  S. A. HALLS  2,765,090
HAND TRUCK
Filed March 30, 1954  2 Sheets-Sheet 1
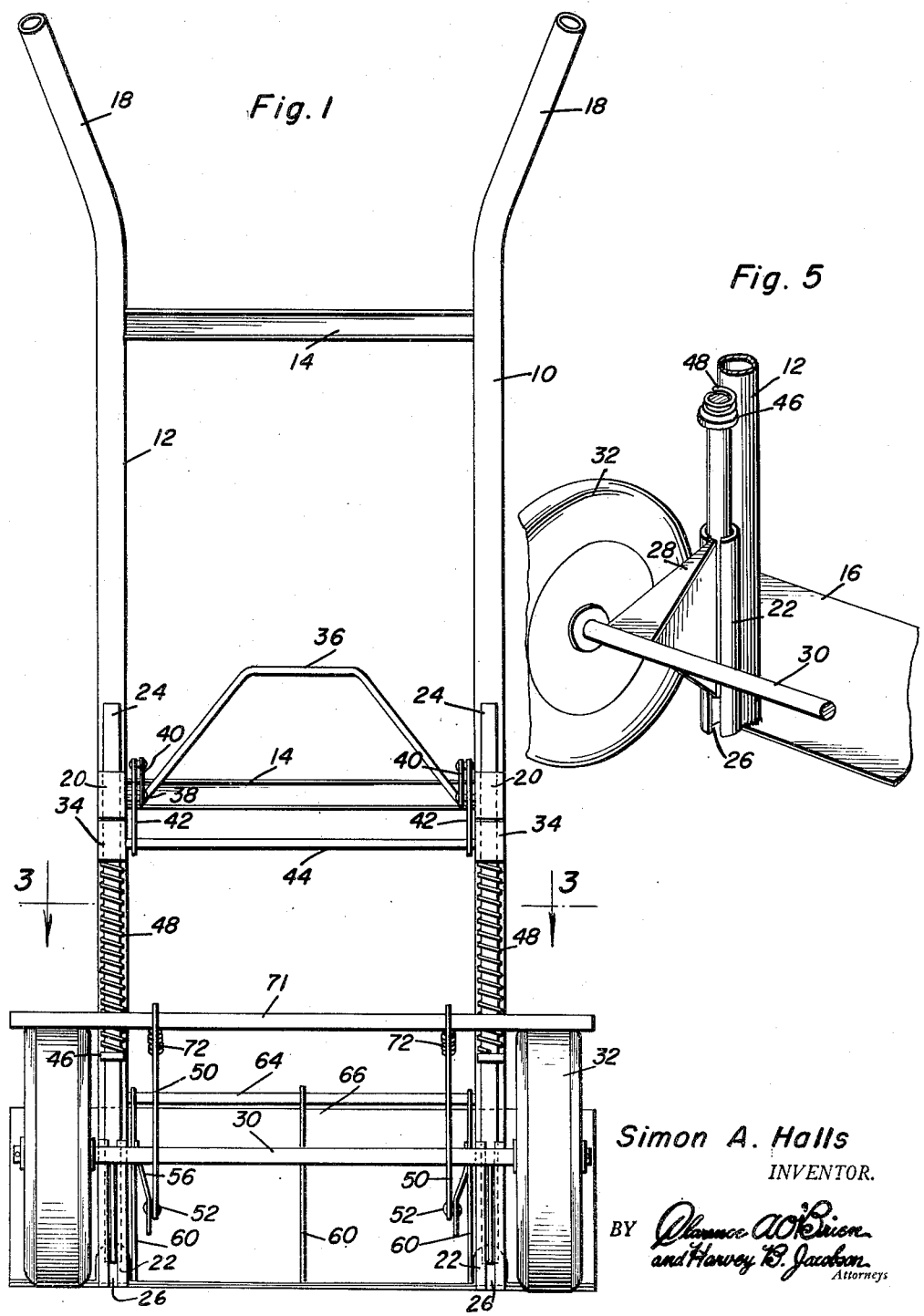
Simon A. Halls
INVENTOR.

Oct. 2, 1956  S. A. HALLS  2,765,090
HAND TRUCK
Filed March 30, 1954  2 Sheets-Sheet 2
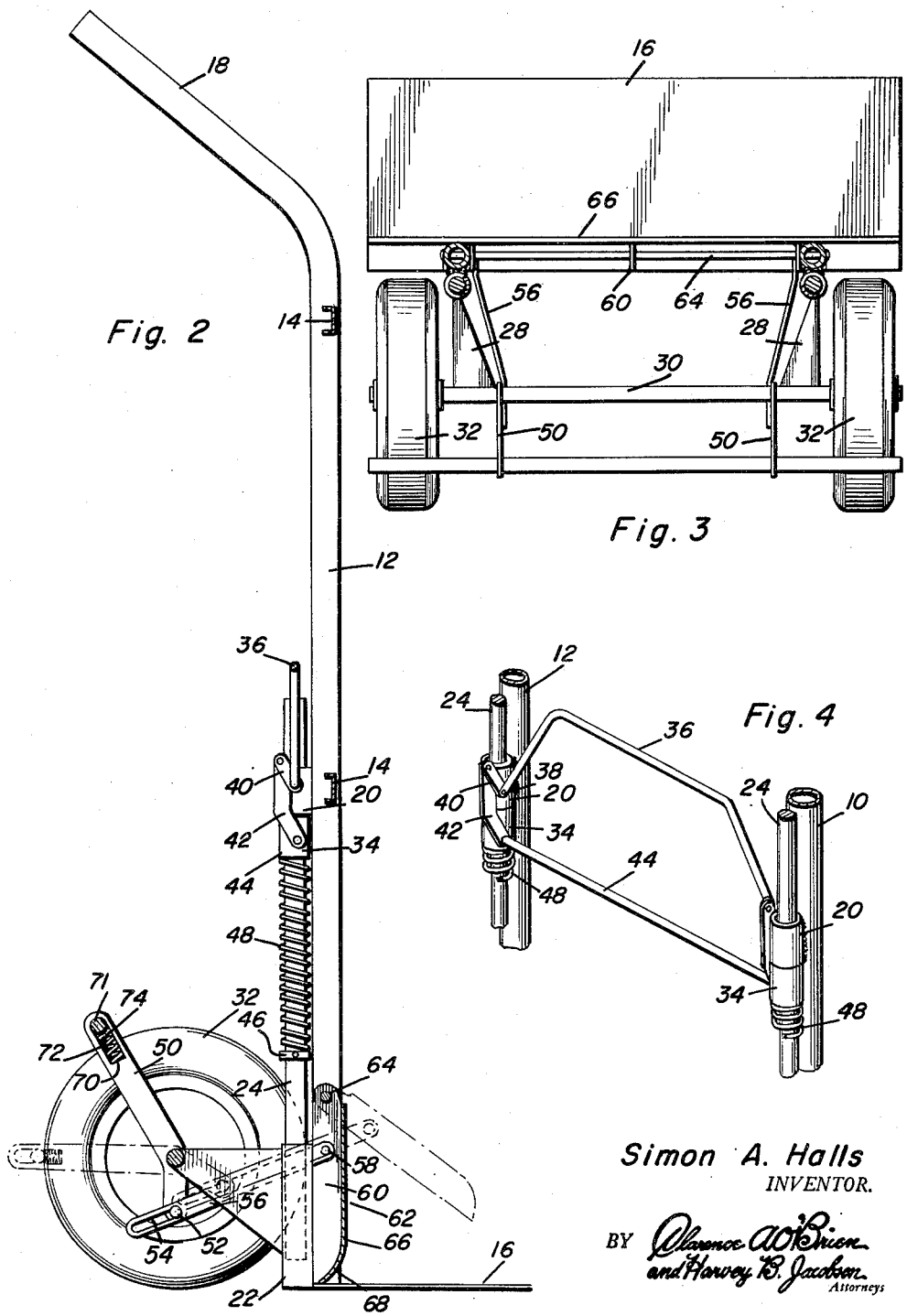
Simon A. Halls
INVENTOR.
BY Clarence A. O'Brien
and Harvey B. Jacobson
Attorneys

United States Patent Office 2,765,090
Patented Oct. 2, 1956

2,765,090

HAND TRUCK

Simon A. Halls, Zumbrota, Minn.

Application March 30, 1954, Serial No. 419,695

4 Claims. (Cl. 214—350)

This invention relates to hand trucks generally, and pertains more particularly to improvements and refinements in hand trucks for aiding in the removal of a load therefrom and in properly positioning the load with respect to the wheels wherein the truck will be balanced most easily.

A primary object of this invention is to provide a hand truck so designed as to confine the tipping balance of the load for loading within the respective area in the same load.

One object of this invention is to provide an improved form of hand truck which incorporates a shiftable wheel and axle assembly whereby the load may be shifted with respect to the wheel to permit the truck to be balanced in a position which will be most comfortable to the user.

Another object of this invention is to provide refinements in a hand truck which contemplates the provision of a pusher member associated with the load receiving platform operated in conjunction with a wheel turning mechanism to simultaneously exert a pushing force against the load and move the truck away from the same, thus greatly simplifying the unloading operation.

These together with other objects and advantages which will become subsequently apparent reside in the details of construction and operation as more fully hereinafter described and claimed, reference being had to the accompanying drawings forming a part hereof, wherein like reference numerals refer to like parts throughout, and in which:

Figure 1 is a rear elevational view of the improved hand truck assembly;

Figure 2 is a transverse section taken through the assembly shown in Figure 1;

Figure 3 is a horizontal section taken substantially along the plane of section line 3—3 in Figure 1;

Figure 4 is a perspective view showing details of a portion of the load shifting mechanism on an enlarged scale; and Figure 5 is an enlarged perspective view showing a portion of the wheel mounting assembly.

Referring now more particularly to the drawings, it will be seen that the hand truck incorporates a pair of spaced elongated side members 10 and 12 which are interconnected by suitable crosspieces 14 and a laterally projecting load receiving platform 16. The upper ends of the side frame members are angulated in the manner shown to provide the hand grip portions 18. Each of the side frame members carries a pair of longitudinally spaced sleeve members 20 and 22 which slidably receive the wheel support bars 24 such that the bars are slidable longitudinally of the frame. The lower sleeve members 22 are provided with longitudinally extending slots 26 so as to provide clearance for the bracket members 28 rigidly attached to and extending between the support rods 24 and the axle 30 in the manner shown most clearly in Figure 5. A wheel 32 is journaled at each end of the axle 30 for movably supporting the truck assembly.

Each of the support rods 24 is provided with a rigid sleeve member 34 which normally abut against the sleeves 20 on the frame to support the frame on the wheel and axle assembly. A treadle member 36 extends between the sleeves 20 and is pivotally attached thereto by suitable pin members 38 and the treadle member is provided with laterally offset end portions 40 beyond the pivot pin 38 which are pivoted to link members 42. A cross-rod 44 extends between and is rigidly attached to the sleeves 34 and the lower ends of the links 42 are journaled thereon in the manner shown most clearly in Figure 4. Spaced from the sleeves 34 on each rod 24 are stop collars 46 and a coil spring 48 is disposed between each corresponding stop collar and sleeve 34 to normally urge the treadle assembly into the position shown.

Thus, when the load being carried necessitates the hand truck frame being tilted to a position more nearly approaching the horizontal than is comfortable for the user to operate, the member 36 is manipulated by hand to project the wheel and axle assembly beyond the lower end of the frame whereby the point of balance of the load will shift such that the frame will be positioned more nearly in a vertical position when proper balance is attained.

To aid in engaging and disengaging with a load, a pair of bellcrank members 50 are rotatably received on the axle 30 and their lower ends are provided with pin members 52 engaged in elongated slots 54 in link members 56 which extend therefrom to a point of pivotal connection, as at 58, to corresponding former members 60 of a pusher assembly indicated generally by the reference character 62. The formers 60 are pivotally attached at their upper ends to a cross-bar 64 extending between the frame members 10 and 12 and a transversely extending pusher plate 66 is rigidly attached thereto. The lower end of the pusher plate 66 may be curved in the manner shown at 68 to prevent the load from being marred or damaged during the removing operation.

The upper ends of the bellcranks 50 are provided with elongated slots 70 and a treadle rod 71 is received through these slots to overlie the wheel members 32 in the manner shown most clearly in Figure 1, and each slot 70 receives a compression spring 72 normally urging the treadle bar to the full line position shown in Figure 2 whereby it will clear the peripheries of the wheels 32. To longitudinally affix the treadle bar 71, pin members 74 are provided thereon which project within the compression springs 72.

When disengaging a load from the platform 16, the operator places his foot on the treadle bar 71 and forces it against the wheels 32 against the action of the compression springs 72 and further forces the bar downwardly to the dotted line position shown in Figure 2 whereby the wheels 32 will be moved to simultaneously back the truck away from the load while the links 56 have swung the pusher assembly 62 to the dotted line position shown to exert a force against the load and prevent the same from remaining on the platform 16. To aid in engaging the platform 16 beneath a load, the operator places his foot against the treadle bar 71 and forces the bar forwardly, which will move the truck toward the load and force the platform 16 thereunder. During this latter manipulation, it will be apparent that the elongated slot 54 in the links 56 permits a lost motion between the pins 52 and the links such that the pusher plate 66 will remain in its normal position.

Of course, when the load is shifted with respect to the wheels, the member 36, while in the shifted position, remains in the shifted position by virtue of the fact that the link members 40 and 42 will have been placed in overcenter relationship with the member 36 abutting the member 44 to retain them in this position until such time as the operator may wish to return the frame to the normal position.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A hand truck comprising an elongated frame having a hand grip portion at one end and a laterally projecting load receiving platform at its other end, a wheel and axle assembly mounted on said frame for longitudinal movement therealong, and means for moving said assembly along said frame, said assembly including a support rod disposed longitudinally of the frame and fixedly connected to said axle, and a pair of sleeve members fixed on said frame slidably receiving said rod, said means including a manually actuated member pivoted to said frame, and linkage connecting said manually actuated member and said rod for shifting the latter longitudinally of the frame upon manipulation of said member.

2. A hand truck comprising an elongated frame having a hand grip at one end and a laterally projecting load receiving platform at its other end, a wheel and axle assembly journaled transversely of said frame adjacent said other end and including a pair of ground wheels, manipulable means on said frame adjacent said platform for urging a load from the platform, force transmitting means for actuating the first mentioned means, the last mentioned means including an elongated member engageable with the peripheries of said wheels and pivotally mounted on said axle for rotation around the same to rotate the wheels for moving the truck away from a load on said platform simultaneously with the actuation of the first mentioned means.

3. A hand truck comprising an elongated frame having a hand grip portion at one end and a laterally projecting load receiving platform at its other end, a wheel and axle assembly journaled transversely of said frame adjacent said other end, manipulable means on said frame adjacent said platform for urging a load from the platform, force transmitting means for actuating the first mentioned means, the last mentioned means including portions engageable with said wheel and axle assembly for moving the truck away from a load on said platform simultaneously with the actuation of the first mentioned means, said last mentioned means including a pair of bell cranks pivoted on said axle, a treadle bar carried by said cranks for reciprocable movement into and out of engagement with the periphery of said wheels, and linkage means connecting said bell crank to said first mentioned means.

4. A hand truck comprising an elongated frame having a hand grip at one end and a laterally projecting load receiving platform at its other end, a wheel and axle assembly journaled transversely of said frame adjacent said other end and including a pair of ground wheels, manipulable means on said frame adjacent said platform for urging a load from the platform, and force transmitting means for actuating the first mentioned means, the last mentioned means including an elongated member engageable with the peripheries of said wheels and pivotally mounted on said axle for rotation around the same to rotate the wheels.

References Cited in the file of this patent

UNITED STATES PATENTS

| 1,027,557 | McCoy | May 28, 1912 |
| 1,192,790 | Knapp | July 25, 1916 |
| 1,525,444 | Gignac | Feb. 10, 1925 |
| 1,770,374 | Berg | July 15, 1930 |

FOREIGN PATENTS

| 17,709 | Great Britain | Aug. 15, 1903 |
| 731,968 | France | June 6, 1932 |